(12) United States Patent
Bates et al.

(10) Patent No.: US 6,963,902 B2
(45) Date of Patent: Nov. 8, 2005

(54) SKIPPING MESSAGES ON MESSAGE BOARDS

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 09/906,749

(22) Filed: Jul. 18, 2001

(65) Prior Publication Data

US 2003/0018706 A1    Jan. 23, 2003

(51) Int. Cl.[7] .................. G06F 15/16; G06F 17/30; G06F 15/173
(52) U.S. Cl. .................. 709/206; 707/3; 709/224
(58) Field of Search .............. 702/176; 709/224, 709/206, 203; 707/3; 705/14; 380/277

(56) References Cited

U.S. PATENT DOCUMENTS

| | | | |
|---|---|---|---|
| 6,571,234 B1 * | 5/2003 | Knight et al. .................. 707/3 |
| 6,606,657 B1 * | 8/2003 | Zilberstein et al. ............ 709/224 |
| 6,778,941 B1 * | 8/2004 | Worrell et al. ................. 702/176 |
| 2002/0101994 A1 * | 8/2002 | Shinzaki ........................ 380/277 |
| 2002/0111865 A1 * | 8/2002 | Middleton et al. ............. 705/14 |
| 2003/0149733 A1 * | 8/2003 | Capiel ........................... 709/206 |

* cited by examiner

*Primary Examiner*—John Follansbee
*Assistant Examiner*—Philip Lee
(74) *Attorney, Agent, or Firm*—Rabin & Berdo, P.C.

(57) ABSTRACT

A computer system includes a computer, operatively connected to a network, and having at least one memory with a plurality of messages and a message agent stored therein. The message agent generates a time score for each message based on how long visitors interact with the message. The message agent also generates a skip score for each message based on whether visitors skip the message. In response to a request to view one or more messages, the message agent creates a filtered set of messages by using a minimum time score and/or a maximum skip score to omit, from the requested messages, any messages having time scores and/or skip scores less or greater than the minimum time score and/or maximum skip score, respectively. The message agent then sends the filtered set of messages to the visitor for viewing. A visitor may set a minimum time score and/or maximum skip score according to preference.

20 Claims, 4 Drawing Sheets

| Message ID | Time | Visitors |
|---|---|---|
| 100 | 847 | 16 |
| 100.1 | 112 | 8 |
| 100.2 | 437 | 15 |
| 100.2.1 | 310 | 7 |
| 100.2.1.1 | 462 | 14 |
| ... | ... | ... |

50 — 51 Message ID, 52 Time, 53 Visitors

| Message ID | Visitor ID | Skipped? |
|---|---|---|
| 100.1 | 1 | 1 |
| 100.1 | 4 | 1 |
| 100.1 | 32 | 1 |
| 100.1 | 41 | 0 |
| 100.2 | 31 | 0 |
| ... | ... | ... |

60 — 61 Message ID, 62 Visitor ID, 63 Skipped?

FIG. 3

SKIPPING MESSAGES ON MESSAGE BOARDS

BACKGROUND OF THE INVENTION

1. Field of the Invention

The invention relates to skipping messages on message boards.

2. Background Information

A message board is a computer system that provides visitors an information source and forum. A message board consists of a computer and message board software (hereinafter, "a message agent"), cooperatively adapted to allow visitors to electronically interact with the message board through the use of a terminal or computer. A visitor may interact with a message board over a network, such as the Internet or an intranet, or through a direct computer connection, as with a modem and communication line (e.g., an analog or digital modem and line) for example. In interacting with a message board, a visitor may post (write) messages to the board, read messages posted by others or post replies to messages posted by others.

In recent years, message boards have become increasingly popular, especially with the increased popularity of the Internet. Accordingly, the number of visitors to a particular message board may be substantial, which may substantially increase the number of messages posted to the message board.

To improve visitor efficiency in reading messages, a message agent may provide a search engine, in which search terms or queries may be submitted by a visitor for interrogation against the messages contained in the message board. While this methodology may assist in locating messages consistent with visitors' interests, it may also include useless messages, as well as exclude useful messages. For example, a visitor interested in dogs (the animal) may submit the search term "dog," which may include messages in which the term "dog" is used in a context other than the animal, as well as exclude messages in which a term other than "dog" was used (e.g., "canine").

Also to improve visitor efficiency in reading messages, a message agent may link two or more related messages together to form a "thread." A thread consists of a parent message (i.e., a message that is not a reply), replies to the parent message, replies to the replies, and so forth. After reading a message, a visitor may "follow" the message's thread by thereafter reading messages related thereto. However, when a visitor follows a thread, time may still be wasted reading messages considered useless by the visitor.

Message agents may provide visitors the ability to skip messages posted by a specific visitor (e.g., one who regularly posts useless messages). However, this methodology may inefficiently skip messages, as it may exclude messages posted by the specific visitor that may nonetheless be useful.

Therefore, there is a need to assist visitors of message boards to efficiently skip messages that are likely to be considered useless by the visitors.

SUMMARY OF THE INVENTION

It is, therefore, a principle object of this invention to provide a system and method of skipping messages on message boards.

It is another object of the invention to provide a system and method of skipping messages on message boards that assists in minimizing the above mentioned problems.

These and other objects of the present invention are accomplished by the system and method of skipping messages on message boards disclosed herein.

In an exemplary aspect of the invention, a message board comprises a computer having a memory with a plurality of messages and a message agent stored therein.

In a further exemplary aspect of the invention, for each of the plurality of messages with which at least one visitor interacts, the message agent generates a time score associated with the message by monitoring the amount of time visitors spend interacting with the message. Visitors interact with a message by reading the message, reading replies to the message and/or writing replies to the message. In computing time scores, the message agent may weigh one or more of the types of interaction differently or the same.

In another exemplary aspect of the invention, for each of the plurality of messages available to at least one visitor, the message agent generates a skip score associated with the message based on whether the visitor reads the message.

In yet a further exemplary aspect of the invention, in response to a request to view one or more of the plurality of messages, the message agent may access, from the at least one memory, a minimum time score and/or a maximum skip score, which the message agent may subsequently use to omit from the requested messages any messages having a time score and/or a skip score less or greater than the minimum time score and/or the maximum skip score, respectively. A minimum time score and/or a maximum skip score may be dynamically created or static (e.g., set by a visitor or system, and stored in the at least one memory or in a cookie on a visitor's terminal or computer).

Thus, through a minimum time score and a maximum skip score, a visitor may efficiently limit the number of messages viewed according to the visitor's or message board's preferences. For example, preferences may be based on the number, or percentage, of visitors skipping posts; the time visitors spent reading messages; a percentage of visitors spending less than X amount of time interacting with a message; etc.

BRIEF DESCRIPTION OF THE DRAWINGS

FIG. 3 shows exemplary time scores and skip scores for the messages illustrated in FIG. 2.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration or order.

Figure 1:
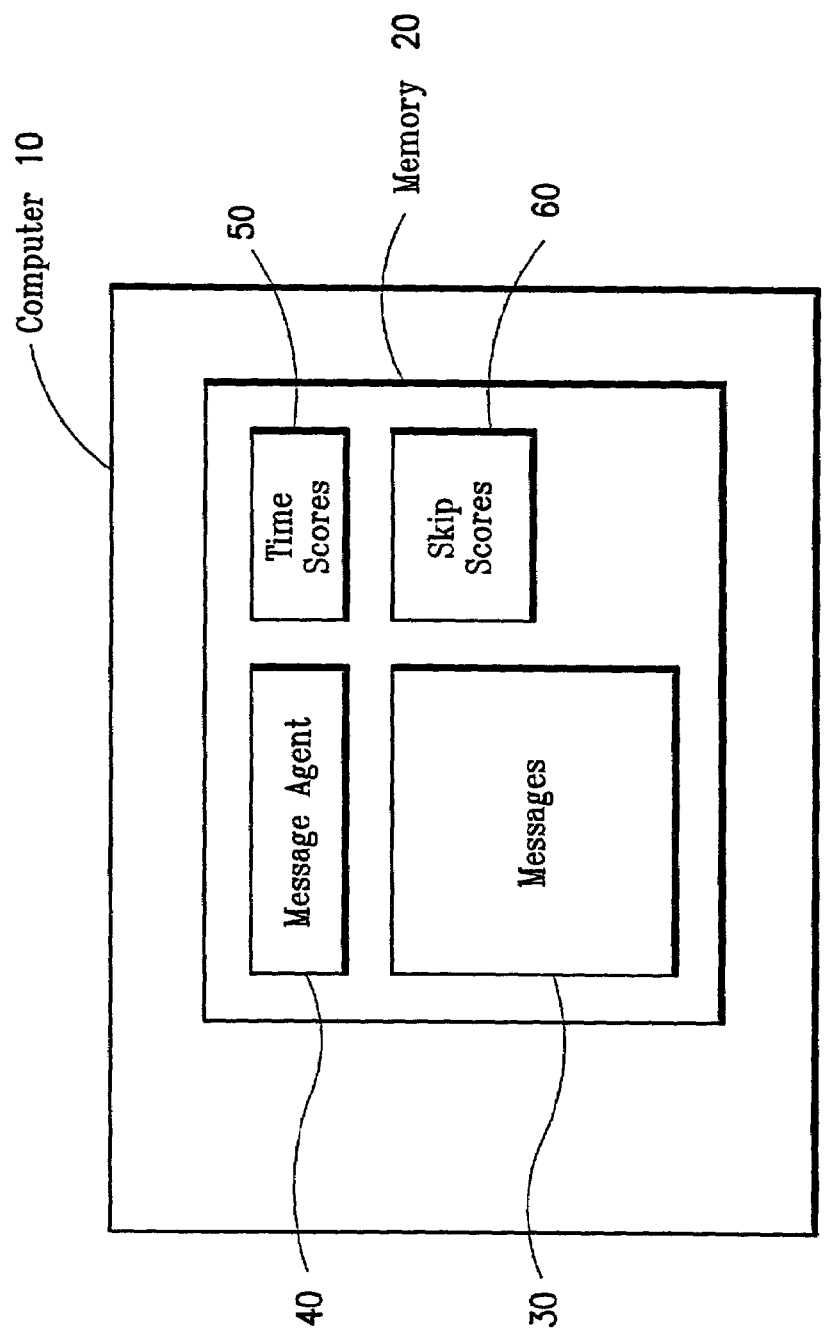
FIG. 1 illustrates an overview of the present invention after a message agent has generated time and skip scores.

FIG. 1 illustrates an overview of the present invention, which comprises a computer 10 having at least one memory 20 with a plurality of messages 30, a message agent 40, and generated times scores 50 and skip scores 60 stored therein.

The storage and access of data may span more than one memory, which may, non-exhaustively, include a RAM, a hard drive, a cache, a register, etc. Further, data may be stored in any format desirable, such as a relation or hierarchical format, for example.

A message may be a parent message or a reply to a message. Data representing a message may include text and/or graphics, and may optionally include formatting data and/or reference data (e.g., thread pointers, date, author, title, etc.).

Figure 2:
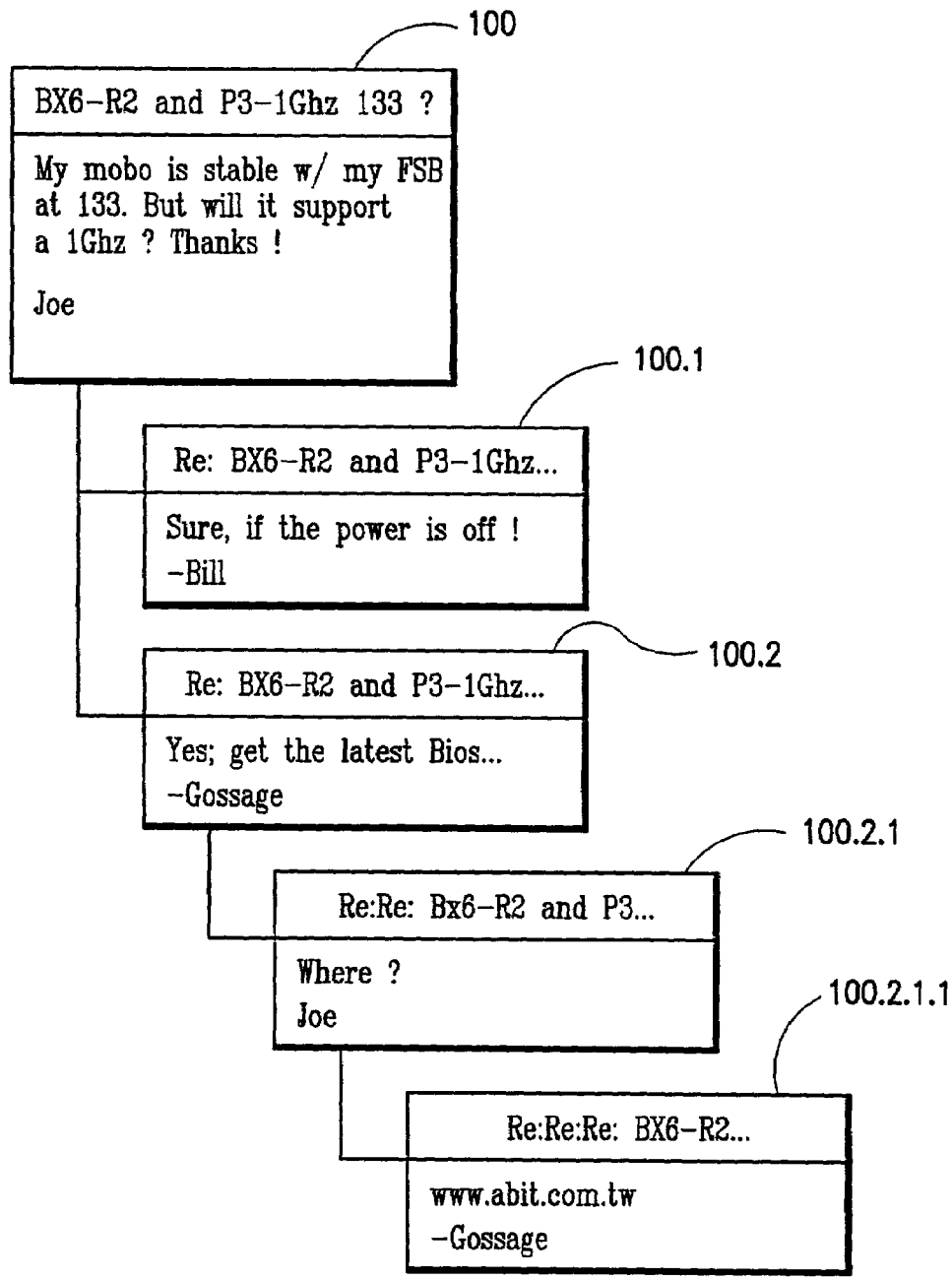
FIG. 2 illustrates an exemplary embodiment of messages organized in a thread.

FIG. 2 shows exemplary messages 30 in a thread format, which includes a parent message 100, level-one replies 100.1 and 100.2, a level-three reply 100.2.1 and a level-four reply 100.2.1.1.

In an exemplary aspect of the invention, for each message with which at least one visitor interacts, message agent 40 generates a time score 50 based on how long the visitors interact with the message. A visitor may interact with a message, by one or more of, reading the message, reading a reply to the message and writing a reply to the message.

In generating a time score, the message agent 40 may utilize a hardware or software clock or counter; a start event; and a stop event. A start event or stop event may be any event that is determinable by the message agent. A message agent 40 may consider as a start event or stop event, when specific data is sent to, received by, or displayed for a visitor; or time data within data received from a visitor (e.g., a time stamp, etc.). As a further example, message agent 40 may use event handlers, such as HTML event handlers, which may be the onLoad and onUnload HTML event handlers.

A time score may be represented by one or more data structures containing data representative of the time visitors spent interacting with a particular message. For example, the data may represent the total time, or average time, spent by visitors who interacted with the message, and may further represent a total number and/or the identity of visitors who interacted with the message. A time score may be in real units of time (e.g., seconds, minutes, hours, etc., or fractions, percentages thereof) or discrete units of time (e.g., a maximum time, units, ticks, etc., or fractions, percentages, etc.). Times scores may be stored in the at least one memory by the message agent.

In a further exemplary aspect of the invention, in generating time scores, a message agent may weigh different types of interaction the same or differently. For instance, a message agent may weigh reading a reply to a message higher than reading the message itself. Thus, for example, a message agent may multiply the time a visitor spends reading a reply by "1.2" to reflect a higher weight.

In yet a further exemplary aspect of the invention, for each message available to at least one visitor, the message agent may generate a skip score associated with the message based on whether the visitor(s) read or skip the message. A message is available to a visitor based on an event that is determinable by the message agent. For example, and not in limitation, the message agent may consider a message available to a visitor; when the message is stored in the at least one memory; when a hyperlink to the message is sent to, received by, or displayed for, the visitor; when at least a portion of the message is sent to, received by, or displayed for, the visitor; when notifying data is sent to, received by, or displayed for, a visitor; etc.

A skip score may be represented by one or more data structures containing data representative of whether visitors read or skip a particular message. For example, the data may represent the number of times an available message has been skipped, and may further represent a total number of visitors to which a message was available, as well as the identity of the visitors to which the message was available (e.g., user id, login name, etc.). A skip score may be in the form of an integer, a percentage, a decimal, etc. Skip scores may be stored in the at least one memory by the message agent.

FIG. 3 illustrates an exemplary aspect of the invention, in which example time scores 50 and skip scores 60 have been generated by message agent 40 for the thread illustrated in FIG. 2. As shown in FIG. 3, time scores 50 may include data representing a message ID 51, a time total 52 and a visitor total 53; and skip scores 60 may include data representing a message ID 61, a visitor ID 62 and a skipped flag 63.

A minimum time score ("MTS") is value used to omit from a set of requested messages (i.e., one or more messages) those messages having a respective time score below the MTS. Similarly, a maximum skip score ("MSS") is a value used to omit from a set of requested messages those messages having a respective skip score above the MSS. An MTS and/or an MSS may be generalized (i.e., applied to all visitors) or individualized (i.e., applied to a single visitor or a group of visitors). An MTS and/or an MSS may be dynamically created by a visitor or message agent (e.g., selected each time a visitor requests a set of messages), or static (e.g., defined by a visitor or message agent, and stored in memory or in a cookie for subsequent access and use).

The message agent is adapted to receive from a visitor a request to view a set of messages (i.e., one or more messages) contained in the message board. For example, a visitor may request to view a search result, a thread of messages, a message group (e.g., messages grouped by topic, date, author, etc.), or one or more messages based on other determinable criteria. The request may be received from a network, such as the Internet, an intranet, or a direct analog or digital connection, or via direct input, for example.

In response to a request to view messages, a message agent may access from the at least one memory an MTS and/or an MSS, with which the message agent may use to omit or filter from the requested messages those messages having respective time scores and/or skip scores that are less or greater than the MTS and/or MSS, respectively. Optionally, a message agent may receive from a visitor state data with which to access an associated MTS and/or MSS. The message agent may be adapted to process only an MTS, only a MSS, or both against the requested messages. The message agent may then send the resulting filtered set of messages to the visitor for viewing thereby.

The message agent may also be adapted to receive from a visitor an MTS and/or an MSS associated therewith. The message agent may thereafter store in the at least one memory, or a cookie, the respective MTS and/or MSS in association with the visitor for subsequent use.

Figure 4:
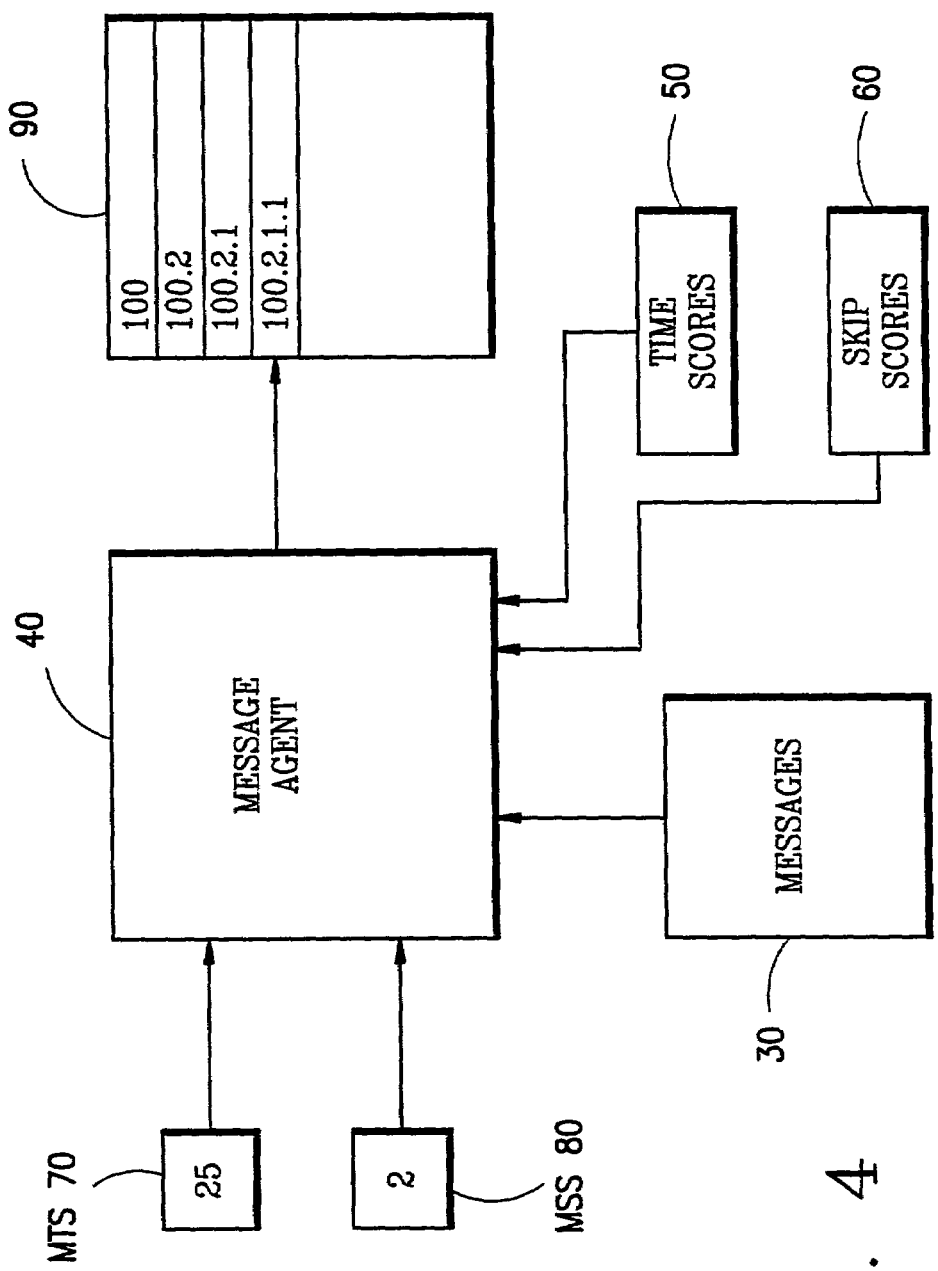
FIG. 4 illustrates an exemplary processing of an MTS and MSS by a message agent against the exemplary time scores and skip scores of FIG. 3.

FIG. 4 illustrates an exemplary processing of an MTS and MSS by a message agent 40 against the exemplary time scores 50 and skip scores 60 (illustrated in FIG. 3) that correspond to the exemplary messages 30 illustrated in FIG. 2. As shown in FIG. 4, an MTS 70 may have the value "25" and an MSS 80 may have the value "2". Accordingly, message agent 40 may create a filtered set of messages 90 from the plurality of messages 30 by omitting from the plurality of messages, those messages having a respective time score 50 less than "25" and a respective skip score greater than "2". Thus, message 100.1, which has an average time score of "14" may be omitted. Further, message 100.1 also has an associated hit score of "3", which would also serve as a basis for omission by message agent 40. Thus, the filtered set of messages 90 would include messages 100, 100.2, 100.2.1 and 100.2.1.1.

It should be understood, however, that the invention is not necessarily limited to the specific process, order, arrangement, embodiments and components shown and described above, but may be susceptible to numerous variations within the scope of the invention. For example, although the above-described exemplary aspects of the invention are believed to be particularly well suited for viewing messages in a thread, it is contemplated that the concepts of the present invention can be applied in other applications. For example, the concepts of the present application can be utilized whenever it is desired to view more than one message from a message board.

It will be apparent to one skilled in the art that the manner of making and using the claimed invention has been adequately disclosed in the above-written description of the preferred embodiments taken together with the drawings.

It will be understood that the above description of the embodiments of the present invention are susceptible to various modifications, changes, and adaptations, and the same are intended to be comprehended within the meaning and range of equivalents of the appended claims.

What is claimed is:

1. In a computer system comprising a computer, operatively connected to a network, and having at least one memory with a plurality of messages and a message agent stored therein, a method performed by said message agent, said method comprising:

for each of said messages with which at least one visitor interacts, generating a generated time score associated with the message, the generated time score being based on how long said at least one visitor interacts with the message;

receiving, from a discriminating visitor via the network, a request to view one or more of said plurality of messages;

accessing, from said at least one memory, a minimum time score;

creating, from said one or more messages, a filtered set of messages by omitting, from said one or more messages, messages having an associated time score less than said minimum time score; and sending, to said discriminating visitor via the network, said filtered set of messages for viewing;

for each of said plurality of messages available to one or more visitors, generating a generated skip score associated with the message, the generated skip score being based on whether said one or more visitors read the message;

accessing, from said at least one memory, a maximum skip score; and further omitting, from said one or more messages, messages having an associated skip score greater than said maximum skip score.

2. The method of claim 1, wherein said at least one visitor interacts with the message by, at least one of, reading the message, reading a reply to the message and writing a reply to the message.

3. The method of claim 1, wherein said at least one visitor interacts with the message by, at least two of, reading the message, reading a reply to the message and writing a reply to the message.

4. The method of claim 1, further comprising: receving, from said discriminating visitor via the network, said maximum skip score.

5. The method of claim 1, wherein each of said plurality of messages is available to said one or more visitors when the message is stored in said at least one memory.

6. The method of claim 1, wherein each of said plurality of messages is available to said one or more visitors when a hyperlink to the message is sent via the network to said one or more visitors.

7. The method of claim 1, wherein each of said plurality of messages is available to said one or more visitors when at least a portion of the message is sent via the network to said one or more visitors.

8. The method of claim 1, further comprising: storing, in said at least one memory, the generated skip score.

9. The method of claim 1, further comprising: storing, in one of said at least one memory and a cookie, said maximum skip score.

10. The method of claim 1, wherein said one or more messages are one of a thread, a search result and a message group.

11. In a computer system comprising a computer, operatively connected to a network, and having at least one memory with a plurality of messages and a message agent stored therein, a method performed by said message agent, said method comprising:

for each of said plurality of messages available to one or more visitors, generating a generated skip score associated with the message, the generated skip score being based on whether said one or more visitors read the message;

receiving, from a discriminating visitor via the network, a request to view one or more of said plurality of messages;

accessing, from said at least one memory, a maximum skip score;

creating, from said one or more messages, a filtered set of messages by omitting, from said one or more messages, messages having an associated skip score greater than said maximum skip score; and sending, to said discriminating visitor via the network, said filtered set of messages for viewing.

12. The method of claim 11, further comprising:

receiving, from said discriminating visitor via the network, said maximum skip score.

13. The method of claim 11, wherein each of said plurality of messages is available to said one or more visitors when the message is stored in said at least one memory.

14. The method of claim 11, wherein each of said plurality of messages is available to said one or more visitors when a hyperlink to the message is sent via the network to said one or more visitors.

15. The method of claim 11, wherein each of said plurality of messages is available to said one or more visitors when at least a portion of the message is sent via the network to said one or more visitors.

16. The method of claim 11, further comprising:

storing, in said at least memory, the generated skip score.

17. The method of claim 11, further comprising:

storing, in one of said at least one memory and a cookie, said maximum skip score.

18. The method of claim 11, wherein said one or more messages are one of a thread, a search result and a message group.

19. A computer system, said system comprising:

a computer, operatively connected to a network, and having at least one memory;

a plurality of messages stored in said at least one memory; and a message agent stored in said at least one memory, wherein said message agent is adapted to generate, for each of said messages available to one or more visitors, a generated skip score associated the message, said generated skip score being based on whether said one or more visitors read the message, to receive, from a discriminating visitor via the network, a request to view one or more of said plurality of messages, to access, from said at least one memory, a maximum skip score, to create, from said one or more messages, a filtered set of messages by omitting, from said one or more messages, messages having an associated skip score greater than said maximum skip score, and to send, to said discriminating visitor via the network, said filtered set of messages for viewing.

20. An article of manufacture comprising a program storage medium readable by a computer, operatively connected to a network, and having at least one memory with a plurality of messages stored therein, the medium tangibly embodying one or more programs of instructions executable by the computer to perform a method, said method comprising:

for each of said plurality of messages available to one or more visitors, generating a generated skip score associated with the message, the generated skip score being based on whether said one or more visitors read the message;

receiving, from a discriminating visitor via the network, a request to view one or more of said plurality of messages;

accessing, from said at least one memory, a maximum skip score;

creating, from said one or more messages, a filtered set of messages by omitting, from said one or more messages, messages having an associated skip score greater than said maximum skip score; and sending, to said discriminating visitor via the network, said filtered set of messages for viewing.

* * * * *